United States Patent [19]

Soleau, Jr.

[11] 4,198,956
[45] Apr. 22, 1980

[54] MULTI-PURPOSE SOLAR ENERGY COLLECTOR

[75] Inventor: Bertrand S. Soleau, Jr., Chantilly, Va.

[73] Assignee: Joe Simpkins, Clayton, Mo.

[21] Appl. No.: 847,567

[22] Filed: Nov. 1, 1977

[51] Int. Cl.² .................................................. F24J 3/02
[52] U.S. Cl. .................................. 126/444; 126/447; 126/450
[58] Field of Search ............... 126/270, 271; 237/1 A; 165/48, 49

[56] References Cited

U.S. PATENT DOCUMENTS

| 2,907,318 | 10/1959 | Awot | 126/271 |
| 4,026,268 | 5/1977 | Bartos et al. | 126/271 |
| 4,067,316 | 1/1978 | Brin | 126/270 |
| 4,068,652 | 1/1978 | Worthington | 126/270 |
| 4,086,909 | 5/1978 | Lyon | 126/270 |

FOREIGN PATENT DOCUMENTS 2310539  12/1976  France ................. 126/271

Primary Examiner—James C. Yeung
Attorney, Agent, or Firm—Witherspoon & Hargest

[57] ABSTRACT

A multi-purpose solar energy collector is disclosed. The collector is a flat plate type of collector that is designed to heat either air or water, or both, and is portable so that it can readily be moved from one place to another. In the air heating mode, the collector is ideally suited for drying grain. After the grain drying season, the collector can be converted to the liquid heating mode to heat agricultural process water or domestic water, for example. In the combined air-liquid heating mode, the collector can be used to provide both heated air and heated liquid.

9 Claims, 5 Drawing Figures

MULTI-PURPOSE SOLAR ENERGY COLLECTOR

BACKGROUND OF THE INVENTION

This invention relates to solar energy collectors and more particularly to a solar energy collector that can be operated in an air heating mode and/or liquid heating mode and is ideally suited for grain drying purposes when operated in the air heating mode.

The drying of farm crops, particularly corn requires a significant amount of energy. Generally, liquid propane or electric power is used for grain drying. Due to the large amount of energy required for grain drying, solar energy appears to be a very natural source of heat for grain drying. However, the apparent economic advantage that one should derive from the use of solar energy has not fully materialized with prior solar collectors due primarily to the fact that the solar collectors are used for a short period of time, the crop drying season, and then remain idle for the balance of the year.

This invention provides a solar energy collector then can be used during the crop drying season to dry crops and that can be used during the balance of the year for other heating purposes. In addition, the solar collector of this invention is so designed that there is minimum of resistance to the air flow through the collector. Grain drying requires large volumes of air flow, up to 60,000 cubic feet per minute, heated through a moderate temperature rise of 3 to 20 Fahrenheit degrees. Fans in the 5 to 60 HP range are required to move the drying air through the grain. Any impediment to the air flow will require higher fan horsepower to move the same amount of air. The prior art solar collectors generally impede the air flow and thereby increase the required fan horsepower. The solar collector of this invention presents a minimum amount of resistance to air flow.

SUMMARY OF THE INVENTION

The apparatus of this invention comprises a flat plate type of solar collector that can be operated in three different modes, an air heating mode, a liquid heating mode and a combined air and liquid heating mode.

The solar collector is preferably configured as a rectangular box like structure with the ends of the box structurally so designed that the ends of the collector can be opened. The collector has an outer sheet of glass or suitable plastic, a second sheet of glass or plastic spaced apart from the first sheet, an absorber located below the second plate. The second plate is spaced apart from the first plate so that an air path or channel is formed between the two plates. The absorber is spaced apart from the bottom of the collector to form a second air path or channel. The absorber carries a plurality of liquid carrying conduits. The outer casing of the collector is made of a heat insulating material with the ends either hinged so that they can be readily opened or secured in any other suitable manner that will permit easy removal and attachment of the ends.

BRIEF DESCRIPTION OF THE DRAWING

A full and complete understanding of the invention can be obtained from the following detailed description when read in conjunction with the annexed drawing in which.

DETAILED DESCRIPTION OF THE INVENTION

Figure 1:
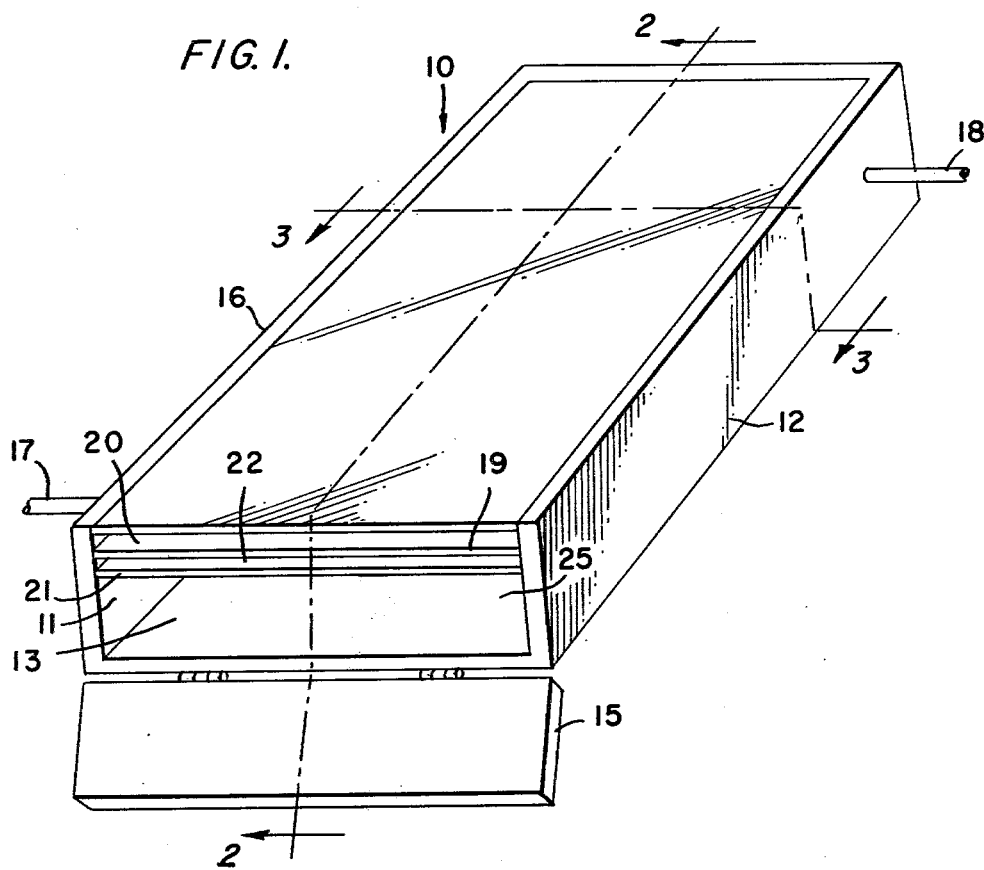
FIG. 1 is an isometric view of a preferred embodiment of the invention with the end pieces not in place.

Referring to the drawing, FIG. 1 is a pictorial view of a preferred embodiment of the solar energy collector of this invention. As shown in FIG. 1 the collector 10 is generally a rectangular shaped box having the side members 11 and 12 and a bottom member 13. Sides 11 and 12 and bottom 13 are all made of a suitable heat insulating material. The collector 10 also includes end members 14 and 15 which are shown open (not in place) in FIG. 1. When end members 14 and 15 are in place, sides 11 and 12, bottom member 13 and ends 14 and 15 form a generally rectangularly shaped box that is closed on all sides except the top. The top of collector 10 is closed by a first or outer transparent plate 16. Transparent plate 16 is made of glass or any suitable transparent plastic. To minimize breakage, transparent plate 16 is preferably made of a breakage resistant plastic. The fluid tubes 17 and 18, one of which serves as a fluid inlet tube and the other as a fluid outlet tube, are brought through sides 11 and 12, respectively. While collector 10 is conveniently made rectangular in shape, collector 10 can be designed and constructed to have any other suitable overall configuration. However, collector 10 is constructed of such size and shape as to be conveniently transportable by a truck or wagon or the like.

Figure 2:
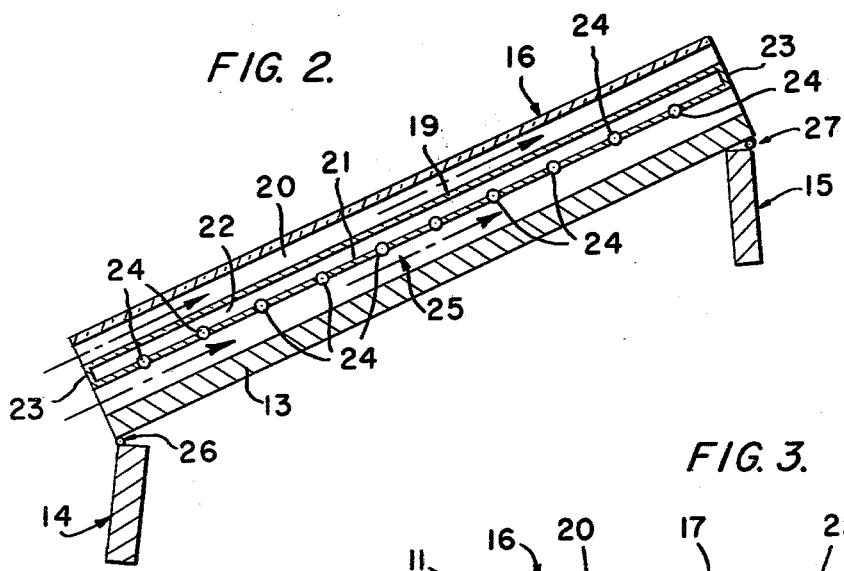
FIG. 2 is a side cross-section view taken along the line 2—2 of FIG. 1.
Figure 3:
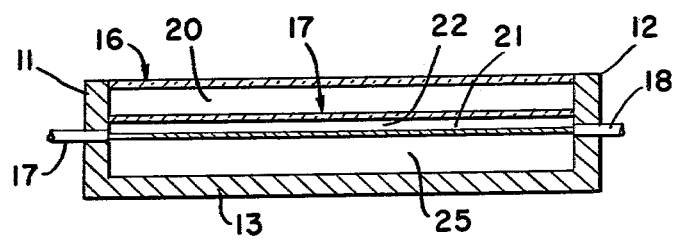
FIG. 3 is an end cross-section view taken along the line 3—3 of FIG. 1.

The internal structural details of collector 10 are shown in FIGS. 2 and 3. FIG. 2 is a side cross-section view taken along the line 2—2 of FIG. 1. FIG. 3 is an end cross-section view taken along the line 3—3 of FIG. 1. As shown in FIGS. 2 and 3, collector 10 also comprises an inner transparent sheet 19 made of glass or a suitable transparent plastic. Inner transparent sheet 19 is spaced apart from outer transparent sheet 16 in such a manner that an unobstructed air flow path or channel 20 extending from end to end of collector 10 is formed between outer transparent sheet 16 and inner transparent sheet 19.

The absorber plate 21 which is made of any suitable heat absorbing material is positioned inside collector 10 below inner transparent sheet 19. The seals 23 form a seal between the ends of absorber plate 21 and inner transparent plate 19 and the sides of inner transparent plate 19 and absorber plate 21 are sealed to sides 11 and 12, as shown in FIG. 3. Thus, the space 22 between inner transparent plate 19 and absorber plate 21 is a closed space. A plurality of fluid carrying conduits 24 are secured to or integrally formed with absorber plate or panel 21. Conduits 24 are coupled to inlet-outlet tubes 17 and 18 in a conventional manner; therefore, the total configuration and the coupling of tubes 17 and 18 to conduits 24 is not shown in any of the figures of the drawing. Absorber plate 21 is positioned in collector 10 so that an unobstructed air path or channel 25 is formed between bottom member 13 and the bottom surface of absorber plate 21.

Ends 14 and 15 of collector 10 are shown as being coupled to bottom member 13 by means of the hinges 26 and 27, respectively, and are shown in their open or not in place position. As will become apparent later, end members 14 and 15 must be so designed that they can readily be changed from the not in place or open position to the in place or closed position shown in FIG. 4. Thus, while ends 14 and 15 are conveniently hingedly coupled to bottom member 13, these ends may be secured to collector 10 in a manner that permits ready deployment in the open or not in place position shown in FIG. 2 to the closed or in place position shown in FIG. 4.

As shown in FIG. 3, outer transparent sheet 16, inner transparent sheet 19 and absorber plate 21 are all secured to sides 11 and 12 to hold these members in place inside collector 10. Any suitable heat resistant adhesive or mechanical device may be used. In addition, slots (not shown) may be cut into sides 11 and 12 with the various plates resting and secured in these slots. The precise manner in which outer transparent plate 16, inner transparent plate 19 and absorber plate 21 are secured to sides 11 and 12 is not important. These members may be secured in any suitable manner to sides 11 and 12.

Figure 4:
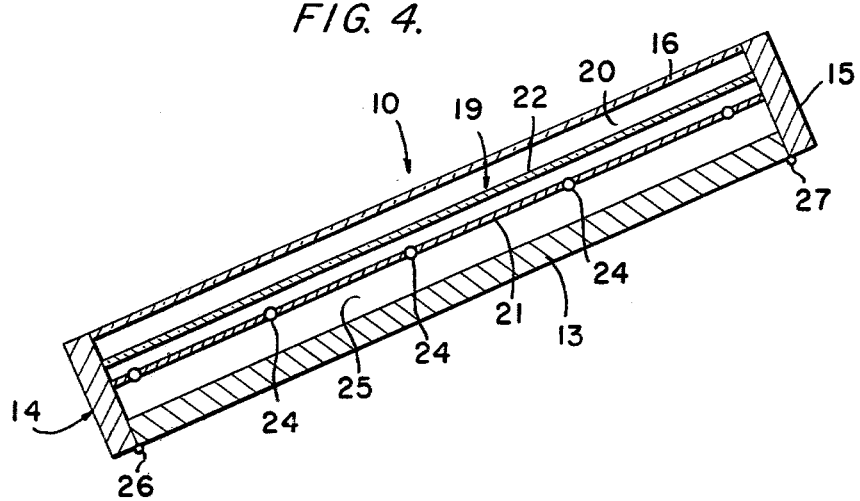
FIG. 4 is another side cross-section view identical to the view of FIG. 1 with the end pieces in place.

FIG. 4 is a side cross-section view that is identical to the cross-section view of FIG. 2 except that ends 14 and 15 are in their closed or in place position. With ends 14 and 15 in place as shown in FIG. 4, collector 10 is closed on all sides. As will become apparent later, FIG. 4 represents the fluid mode of operation of the invention.

Figure 5:
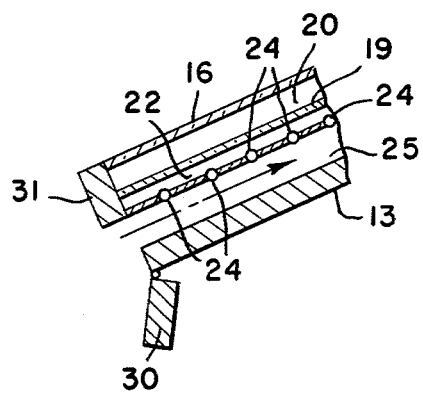
FIG. 5 is a fragmentary side cross-section view showing a variation of the structure of the ends of the collector.

FIG. 5 is a fragmentary side cross-section view showing a variation of structure of the end pieces of collector 10. Only one end piece is shown in FIG. 5 since both ends are identical. As shown in FIG. 5, the ends of collector 10 are formed of two separate pieces, the pieces 30 and 31. Piece 30 is in the open or not in place position and piece 31 is in the closed position. In this variation, air flow path or channel 25 is open while air flow path or channel 20 is closed. While piece 31 is shown as being closed in FIG. 5, piece 31 can also be designed to be readily detached and attached to collector 10. In this manner, either or both of the air flow paths or channels 20 and 25 can be selectively or permanently closed or open.

The solar energy collector of this invention operates in the air heating only mode as follows: Considering FIGS. 1 and 2 which show ends 14 and 15 open or not in place, solar energy heats solar absorber plate 21. In this mode no liquid is flowing through conduits 24. Air, force fed by means of a blower fan (not shown), passes through air flow channel 20 and through air flow channel 25 and is heated by absorber plate 21. Thus, considering the arrows in channels 20 and 25, the air leaving collector 10 at side 15 is hotter than the air entering collector 10 at side 14. If collector 10 is used for grain drying purposes, the hotter air leaving collector 10 at side 15 is forced through the grain to dry the grain. Because of the fact that channels 20 and 25 present an unobstructed air flow path, large volumes of air can be forced through these air channels with minimum frictional resistance. Thus, collector 10 provides the large volume of air necessary to dry grain. Further, the turbulence caused by the fan forcing the air through channels 20 and 25 aids in the transfer of the heat from absorber plate 21 to the air. Since solar absorber plate 21 is sealed from channel 20 by inner transparent sheet or plate 19, absorber plate 21 is protected from damage by contaminants in the air.

Instead of having the air flow through both channels 20 and 25, channel 20 can be sealed as shown in FIG. 5 so that air flows through channel 25 only. Of course, channel 25 could be sealed and with air flow through channel 20 only if end piece 30 is closed onto collector 10 and end piece 31 is removed. Normally if only one channel is used, the larger channel 25 would be used. Like most flat plate collectors, bottom 13 is made of a good heat insulating material. Therefore, heat loss through the bottom of collector 10 is minimized to increase the efficiency of the collector. With minimum heat loss through bottom member 13, most of the heat transfer is from absorber plate 21 to the air flowing through channel 25.

When the grain drying season is over, collector 10 can be moved from the grain bins and utilized elsewhere to, for example, heat water or to provide space heating. In this mode of operation, end pieces 14 and 15 are closed as shown in FIG. 4 or, if the variation of FIG. 5 is used, end pieces 30 and 31 are both closed so as to close collector 10 on all sides. In this mode, a liquid is pumped through conduits 24 and heated by absorber plate 21. If tube 17 is the inlet tube, fluid is pumped into collector 10 through tube 17, flows through conduits 24 to be heated and then flows out of collector 10 through tube 18. Tube 18 carries the heated fluid to a conventional heat exchanger. Thus, in this mode, collector 10 operates as a conventional fluid solar collector.

A third mode of operation is also possible with collector 10. In this third mode, ends 14 and 15 are opened so that air may flow through channels 20 and 25 or, in the variation of FIG. 5, end pieces 30 and/or 31 are opened so that air can flow through either channel 20 or 25 or both. In addition, fluid flows through conduits 24. Thus, in this mode, both air and fluid are heated by absorber plate 21. The air flowing through channel 25 and/or channel 20 remains dry since the fluid in collector 10 flows through conduits 24. The amount of air flowing through either or both of channels 20 and 25 can be controlled by varying the speed of any fan used or by partially blocking these channels with ends 14 and 15 or end pieces 30 and 31 in FIG. 5. To this end, the ends of collector 10 can be so designed that they can be totally removed or so designed that they can be adjusted from a fully open position (removed) to a fully closed position with various degrees of openess between these two extreme positions to thereby control the flow of air through the channels.

From the foregoing description of the invention, it should be apparent that the invention provides a multipurpose solar energy collector that is ideally suited for use in grain drying. The solar collector of this invention provides for the heating of the large volumes of air necessary for grain drying. In addition, the solar collector of this invention can be put to other uses after the grain drying season is over since it is readily transportable and operates in an air heating and/or a fluid heating mode.

In the air heating mode, any number of collectors 10 may be arranged in any series and/or parallel combination. When arranged in series, the heated air outlet becomes the cold air inlet for the next collector in line. This type of flexibility permits the employment of an arrangement of collectors to suit the heating requirement for a particular application and/or the weather conditions. Similar flexibility (series and/or parallel configurations) is provided in the liquid and/or liquid-air modes to meet varying heating requirements and/or weather conditions. In the liquid mode, the collectors are connected in series by connecting the outlet tube of one collector 10 to the inlet tube of the next collector 10.

While the invention has been described with reference to a particular embodiment with one variation thereof, it will be obvious to those skilled in the art that various changes and modifications can be made to the embodiment shown and described without departing from the spirit and scope of the invention as defined in the claims.

I claim:

1. A portable solar energy collector comprising:
a housing made of a heat insulating material, said housing being made of a heat insulating material and having a bottom member, two side members and two end members;
a first transparent plate secured inside said housing;
a second transparent plate secured inside said housing and spaced apart from said first transparent plate such that a first channel is formed between said first transparent plate and said second transparent plate, said first channel being closed at one end by one of said two end members and being closed at its other end by the other one of said two end members when said two end members are closed on said two side members, said bottom member and said first transparent plate;
a heat absorber panel secured inside said housing between said second transparent plate and said bottom member, thereby forming a second channel between said second transparent plate and said absorber panel and a third channel between said absorber panel and said bottom member, said third channel being closed at one end by one of said two end members and being closed at its other end by the other one of said two end members when said two end members are closed on said two side members, said bottom member and said first transparent plate;
a first end piece secured to one end of said second channel to seal said one end of said channel and a second end piece secured to the other end of said second channel to seal said other end of said second channel, whereby said second channel is a closed channel formed by said second transparent plate, said absorber plate and said first and second end pieces; and
means to selectively heat air and fluid.

2. A portable solar energy collector as defined in claim 1 wherein said means to selectively heat air comprises means to remove said end members from said housing such that said first and third channels are open to permit air to flow through said first and third channels to be heated by said absorber panel, said air flowing into one end of said collector and out the other end.

3. A portable solar energy collector as defined in claim 1 wherein said end members are each formed of two pieces and wherein said means to heat air comprises means to remove one of said two pieces of said end members to open said third channel to permit air flow through said third channel, said air flowing into one end of said collector at one temperature and out of the other end of said collector at a higher temperature.

4. A portable solar energy collector as defined in claim 1 wherein said means for selectively heating a fluid includes fluid carrying conduits in heat transfer relationship with said absorber panel.

5. A portable solar energy collector as defined in claim 1 wherein said means to selectively heat air and a fluid comprises means to permit air flow through at least one of said first or third channels to be heated by said absorber panel and a plurality of fluid carrying conduits in heat transfer relationship with said absorber panel to heat the fluid in said plurality of conduits.

6. A portable solar energy collector as defined in claim 1 wherein one of said two pieces of each one of said end members is permanently secured to said collector.

7. A solar energy collector as defined in claim 1 wherein a plurality of said solar energy collectors are connected in series.

8. A solar energy collector as defined in claim 1 wherein a plurality of said solar energy collectors are connected in parallel.

9. A solar energy collector as defined in claim 1 wherein a plurality of solar energy collectors are connected in a series-parallel arrangement.

* * * * *